Sept. 26, 1961 R. FROHMAN 3,001,711
TRANSISTOR ADDER CIRCUITRY
Filed Dec. 3, 1956 2 Sheets-Sheet 1
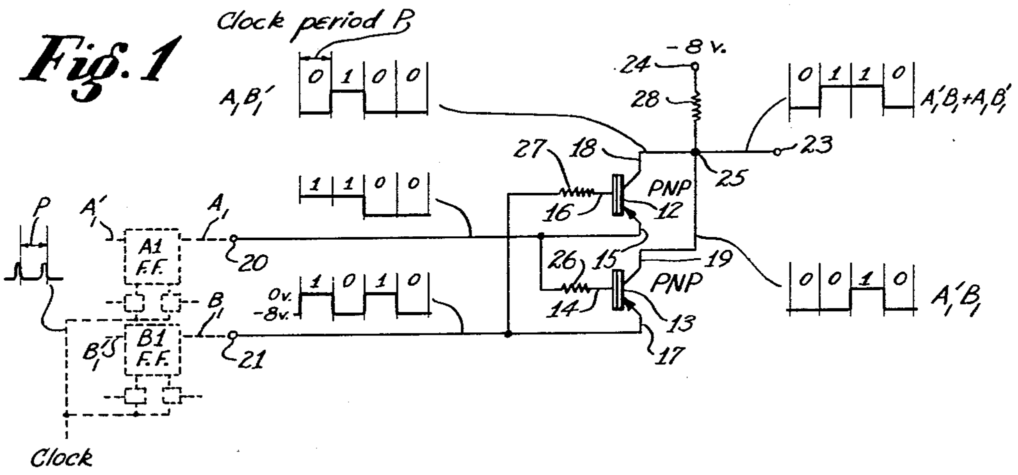
Fig. 3
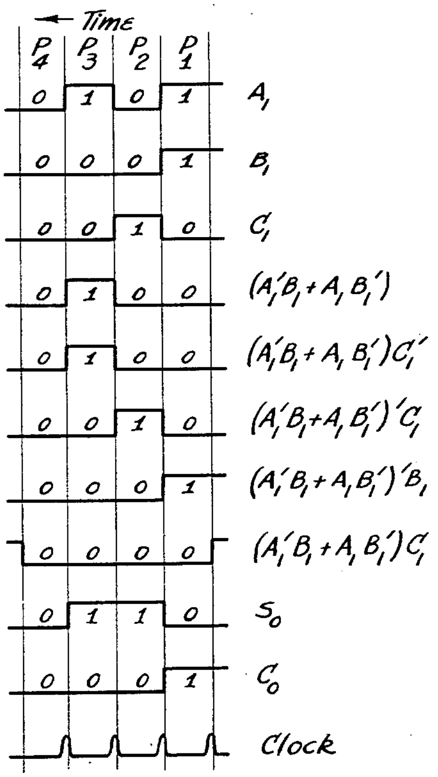
INVENTOR:
Robert Frohman
By [signatures]
His Attorneys

TRANSISTOR ADDER CIRCUITRY

Filed Dec. 3, 1956

2 Sheets-Sheet 2

INVENTOR:
Robert Frohman
By Carl Bernst
Louis A Kline
John T. Matlago
His Attorneys United States Patent Office 3,001,711
Patented Sept. 26, 1961

3,001,711
TRANSISTOR ADDER CIRCUITRY

Robert Frohman, Gardena, Calif., assignor to The National Cash Register Company, Dayton, Ohio, a corporation of Maryland Filed Dec. 3, 1956, Ser. No. 625,847
12 Claims. (Cl. 235—176)

This invention relates to electronic digital computing circuits and more particularly to circuits useful for adding binary digits represented by two-valued signals.

As well known, addition of binary numbers can be carried out with circuits comprised of combinations of logical networks formed of diodes and/or transistors. Adder circuits of this type heretofore required a large number of such gating components since the practice is to provide both logical "and" and logical "or" networks for combining both the true and the inverted signals representing the incoming binary digits in order to obtain the desired sum. Also, such adding circuits have heretofore been limited as to the repetition rate at which they can operate due to the distributed capacitance caused by the large number of these components which, together with the resistors in the gating components, resulted in the circuits having a slow response time.

The adder circuits of this invention utilize transistors in a novel simplified logical gating circuit arrangement including a pair of transistors provided with binary signal inputs on the base and the emitters thereof and a common load resistor which connects both collectors of the transistors to a low potential source such that an output lead connected across the load resistor has a high potential signal thereon when either one or the other of the transistors conducts. In this arrangement one or the other transistor conducts when the binary input to the emitter thereof is high and the binary input to the base thereof is low in potential. The conducting transistor produces a high potential signal on the output lead which represents a logical "and" combination of the term on the emitter and the inverse of the term on the base thereof. Thus it can be stated that the combination of transistors connected in this circuit arrangement performs the functions of both an "and" gate and an "or" gate in a highly simplified and desirable manner.

One feature of the novel circuit arrangement is that the number of components which contribute distributed capacitance is small and thus the transient problems are minimized so that the circuits have a fast response time, thus enabling addition to be carried out at a fast repetition rate. This results from the fact that the logical "and" operations are, in effect, mechanized without the use of resistors and only a small resistor is required for the "or" gate because of the amplifying property of the transistors.

It is accordingly an object of this invention to provide a simplified logical gating circuit which adds input signals representing binary digits without also requiring the input signals to be supplied in their inverted form.

It is another object of this invention to provide an adder circuit utilizing the novel logical gating circuits of the present invention which is capable of carrying out addition on digits represented by binary signals having a fast rate of repetition.

These and other objects of this invention as well as a better understanding and comprehension thereof can be obtained from the following description and drawings in which:

FIG. 1 is a schematic diagram of one preferred form of the gating circuit of the present invention.

FIG. 3 is a diagram of the waveforms appearing at various points of the adder circuit during the operation thereof.

Figure 2:
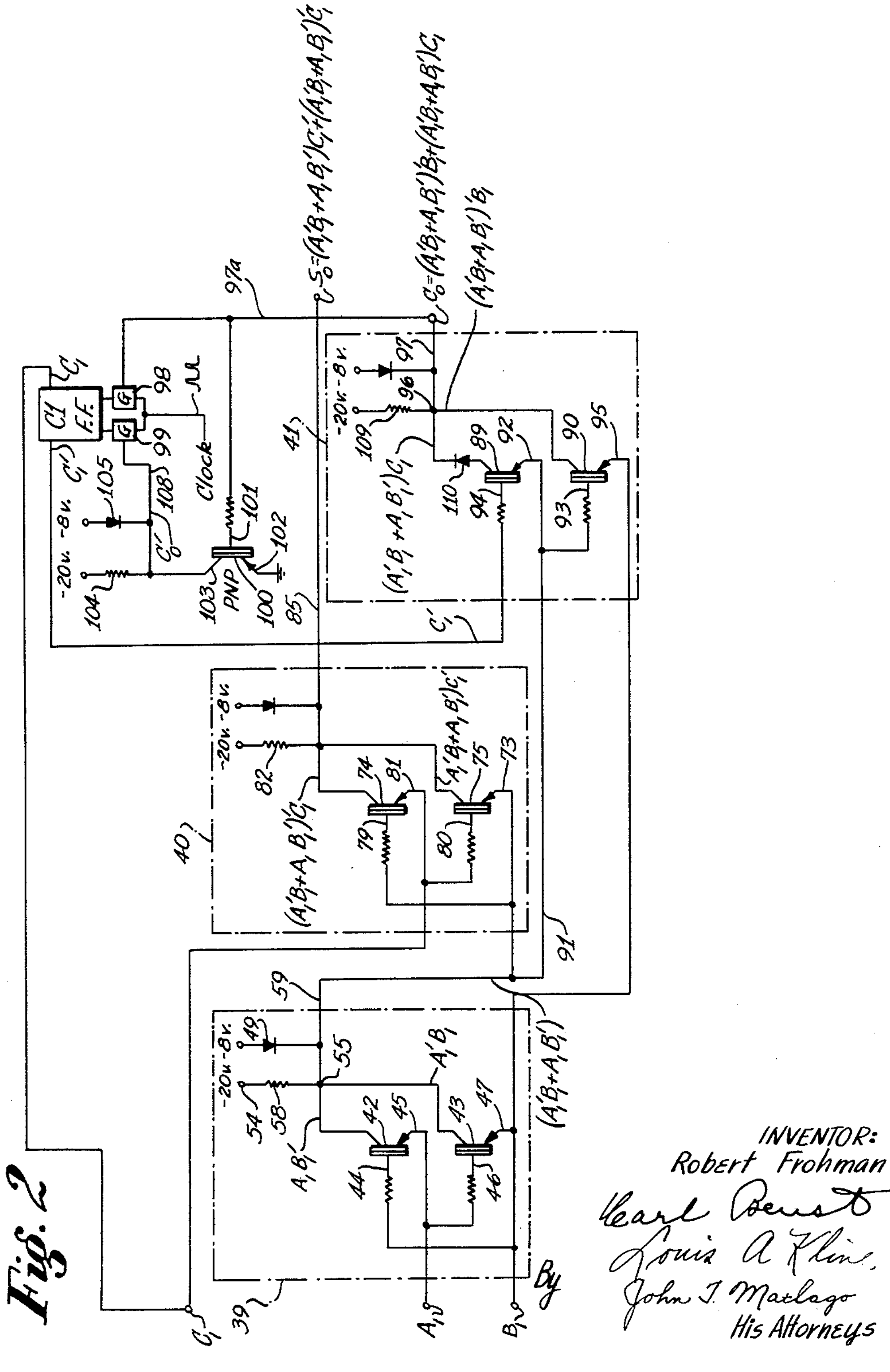
FIG. 2 is a schematic diagram of an adder circuit embodying the gating circuit of FIG. 1.

Reference will first be made to FIG. 1 which shows a schematic diagram of the transistor logical gating circuit arrangement of the present invention.

This circuit comprises two p-n-p transistors 12 and 13 which respond to binary signal inputs applied on terminals 20 and 21. The binary input signal on terminal 20 is connected to the base 14 of transistor 13 by way of current limiting resistor 26 and is also connected directly to the emitter 15 of transistor 12. The binary input signal on terminal 21 is connected to the base 16 of transistor 12 by way of current limiting resistor 27 and is also connected directly to the emitter 17 of transistor 13. The collectors 18 and 19 of transistors 12 and 13, respectively, are connected to junction 25, which in turn is connected to a —8 volt terminal 24 by way of resistor 28. The output terminal 23 is also connected to junction 25. As illustrated, the source of digital input signals to terminals 20 and 21 may be the true outputs $A_1$ and $B_1$ of flip-flops A1 and B1, respectively.

It is well understood in the computer art that a circuit which performs an exclusive "or" function operates to perform a portion of an adding process in that it adds two input binary signals and provides a "one" output only when one of the binary input signals is "one" and the other is "zero," conditions which can be expressed by the Boolean algebra expression $$(A_1'B_1+A_1B_1')$$

It should be noted in FIG. 1 that the circuits of this invention use only the two binary input signals $A_1$ and $B_1$ as obtained from the flip-flops A1 and B1, respectively, without requiring separate inverted signals representing their primes. As will be more clearly explained in the ensuing description, the above Boolean expression of an exclusive "or" function is satisfied whenever the two input terms are different, that is, if one input is high and the other input is low in potential, for example. It is to be noted that the two logical potential levels employed in the circuits of this invention, which mechanize the Boolean expressions, are 0 volts and —8 volts, the 0 volt level representing a "one" state and the —8 volt level representing a "zero" state of the digital signal, for example.

The action of this circuit will now be explained in detail. Transistors 12 and 13 each form one of the products of the output sum signal $(A_1'B_1+A_1B_1')$. Thus, when input $A_1$ is high and input $B_1$ is low in potential, junction 25 is substantially at the high logical level potential (0 volts) due to current flowing from emitter 15 to collector 18 of transistor 12 and through resistor 28 to terminal 24. This high potential at junction 25 is indicative of the "and" signal $A_1B_1'$. When input $A_1$ is low and input $B_1$ is high in potential, junction 25 is substantially at the high potential (0 volts) due to current flowing from emitter 17 to collector 19 of transistor 13 and through resistor 28 to terminal 24. This high potential at junction 25 is indicative of the "and" signal $A_1'B_1$. Therefore, junction 25 is at the high potential, i.e., substantially 0 volts, when either transistor 12 or 13 is conducting through resistor 28. It should be noted that during the period transistor 12 is conducting, due to $A_1$ being high and $B_1$ being low in potential, transistor 13 is cut off since its base 14 is connected to the high potential of $A_1$ and its emitter is connected to the low potential of $B_1$. On the other hand, during the period transistor 13 is conducting, due to $A_1$ being low and $B_1$ being high in potential, transistor 12 is cut off. It should be noted that, if $A_1$ and $B_1$ are both high or are both low in potential, neither of the transistors 12 or 13 is able to conduct since their emitters and bases are connected to the same potential. Under these latter conditions, no current flows through resistor 28 and the low voltage of terminal 24 is impressed on junction 25, i.e., output terminal 23 is at the low potential of −8 volts.

It should now be clear that, because of this arrangement of connecting the binary input signals on the base of each of the transistors to the emitter of the other, each of the transistors functions when conducting to effectively generate one of the two "and" combinations forming an exclusive "or" function, eliminating the need for resistors as used with conventional "and" gates. Further, because of the elimination of these "and" gate resistors and because of the amplification through transistors 12 and 13, which enables the distributed capacitance to be quickly charged, resistor 28, which is part of the "or" gate, can have a very small value and still make it possible for the signal on terminal 23 to swing to a high logical potential level within the desired time, i.e., generate pulses with a fast rise time. This small resistor of the "or" gate also allows the output pulses to have a fast fall time because of the short discharge time of the distributed capacitance associated therewith.

As a further example of the operation of this logical gating circuit, the explanation will be made with reference to the digits received from flip-flops A1 and B1 as represented by signals $A_1$ and $B_1$. For purposes of explanation, it will be assumed that the digits which are represented by the signals $A_1$ and $B_1$ are effectively stepped into flip-flops A1 and B1, respectively, at the end of each clock period P by control signals (not shown) applied to the trigger gate inputs of these flip-flops. When the digits stored in flip-flops A1 and B1 are both "one" or both "zero," neither transistor 12 nor 13 conducts, and consequently the signal $(A_1'B_1+A_1B_1')$ appearing at output terminal 23 is low (−8 volts) in potential. When the digit stored in flip-flop A1 is "one" and the digit stored in flip-flop B1 is "zero," or vice versa, i.e., if the digits being stored are different, one or the other of the transistors conducts and the signal $(A_1'B_1+A_1B_1')$ appearing at output terminal 23 is high (substantially 0 volts) in potential. Thus this circuit operates as a portion of a half-adder, i.e., it forms the sum of the digits stored in flip-flops A1 and B1.

The adder circuit shown in FIG. 2 comprises logical gating circuits 39 and 40, such as shown and described in FIG. 1, together with a carry generating circuit 41 and associated circuitry.

Circuit 39, comprised of transistors 42 and 43, is arranged similar to the logical gating circuit shown and described in FIG. 1, differing therefrom by providing a lower voltage of −20 v. at terminal 54 of load resistor 58, and further providing a clamping diode 49 orientated to clamp junction 55 at the low logical level voltage of −8 volts. Thus circuit 39 has digital input signal $A_1$ connected to the emitter 45 of transistor 42 and to the base of transistor 43, and has digital input signal $B_1$ connected to the emitter 47 of transistor 43 and to the base 44 of transistor 42. From the previous description it should be clear that, with this arrangement, the signal $(A_1'B_1+A_1B_1')$ on the collector output line 59 of circuits 39 is high in potential whenever the digit inputs $A_1$ and $B_1$ are different in value.

Circuit 40, comprised of transistors 74 and 75, is arranged identically to circuit 39. Here, however, the collector output line 59 of circuit 39 is connected to the base 79 of transistor 74 and to the emitter 73 of transistor 75. The other input to circuit 40 is the carry digit signal $C_1$ which is connected to the base 80 of transistor 75 and the emitter 81 of transistor 74. It should be noted that the potential level on the collector output line 85 of circuit 40, determined by current flow through resistor 82, represents the sum digit signal $S_0$.

The carry circuit 41, comprised of transistors 89 and 90, differs from the other circuits in that it is provided with three signal inputs. One of these inputs is the signal on output line 59 of circuit 39 which is connected by extension 91 thereof to the emitter 92 of transistor 89 and the base 93 of transistor 90. The second of these inputs is the false output signal $C_1'$ of the C1 flip-flop which is connected to the base 94 of transistor 89, and the third input is signal $B_1$ which is connected to the emitter 95 of transistor 90. The output line 97 of circuit 41, connected to junction 96, generates the carry-out digit signal $C_0$ during each clock period of the adding process which, after a delay, is fed back into the adder circuit as the carry-in digit signal $C_1$ during the succeeding clock period. Thus, to delay the carry-out digit signal $C_0$, output line 97 is connected by a line **97*a* to control the true trigger input gate 98 of storage flip-flop C1. Line 97*a* is also connected to the base 101 of a p-n-p transistor 100 having a grounded emitter 102. The collector 103 of transistor 100 is returned through a load resistor 104 to the −20 v. source. The output line 108 which is clamped at −8 v. by diode 105 has impressed thereon the inverted carry-out signal $C_0'$, which is used to control the false trigger input gate 99 to flip-flop C1. Thus, as well understood in the prior art, either trigger gate 98 or 99 is opened during each clock period P of the adding process to enable a clock pulse to trigger the C1 flip-flop so as to store the carry digit therein at the end of the clock pulse period. The true and the false signal outputs $C_1$ and $C_1'$ of flip-flop C1 are provided as inputs to circuits 40 and 41**, respectively, as previously described.

It should be noted that carry circuit 41 provides diode 110 in the collector path of transistor 89. This diode is orientated to prevent a back current flow through transistor 89 when the other transistor 90 in the circuit is conducting. It should be noted that this condition did not exist in the circuits 39 and 40 because of the arrangement whereby each of the two binary signal inputs was connected to the base of one and the emitter of the other transistor, thus assuring that one transistor is cut off when the other conducts.

It has previously been shown in the art that circuitry for serially generating the sum of a pair of digits, taking into account the carry digit as a result of the previous stage addition, can be described by Boolean algebra equations. Accordingly, the sum and carry logical equations $S_0$ and $C_0$, respectively, for defining binary addition are well understood and are presented here merely to aid in explaining the circuit arrangement and operation of the adder circuit; thus the sum equation is:

$$S_0=(A_1'B_1+A_1B_1')C_1'+(A_1'B_1+A_1B_1')'C_1$$

and the carry equation is:

$$C_0=(A_1'B_1+A_1B_1')'B_1+(A_1'B_1+A_1B_1')C_1$$

It may be momentarily noted here that the interpretation of the first "and" expression, $(A_1'B_1+A_1B_1')'B_1$, in the carry equation $C_0$ is that if the $A_1$ and $B_1$ inputs are "not different" in value and the $B_1$ input is a "one," then it follows that the $A_1$ input is also a "one." In other words, if $A_1$ and $B_1$ are both "ones," then a carry-out digit "one" is generated. The interpretation of the second "and" expression, $(A_1'B_1+A_1B_1')C_1$, in the carry equation $C_0$ is that if $A_1$ and $B_1$ are "different" in value, one of them must be equal to "one," and if the carry-in digit is also a "one," then the carry-out must be a "one."

The operation of this full adder circuit will now be explained while operating as a serial adder of a pair of binary digits, one represented by the signal $A_1$ and the other represented by the signal $B_1$, taking into account the carry digit represented by the signal $C_1$ generated as a result of the addition during the previous clock period. The outputs generated are the sum digit $S_0$ and the carry digit $C_0$, and the carry signal $C_0$ is stored in flip-flop C1 at the end of each clock period to become the input carry signal $C_1$ for the addition during the next period. When $A_1$ and $B_1$ are applied to the circuit 39, the output signal on output line 59 is high in potential when one or the other of the "and" signals $(A_1'B_1+A_1B_1')$ is true or at the high potential, similar to the circuit of FIG. 1. Thus junction 55 is substantially at the high potential (0 volts) when either transistor 42 is conducted to form the "and" signal $(A_1B_1')$ or transistor 43 is conducting to form the "and" signal $(A_1'B_1)$, and junction 55 is at the low potential (−8 volts) when neither transistor is conducting. It should be noted that junction 55 is prevented from ever dropping below the low logical level of −8 volts by clamping diode 49.

Circuit 40 generates an exclusive "or" function in response to the signal $(A_1'B_1+A_1B_1')$ generated on the output 59 of circuit 39 and the carry signal $C_1$ on the true output of flip-flop C1. Transistors 74 and 75 each generate one "and" expression of the sum equation $S_0$, transistor 74 forming the "and" signal $(A_1'B_1+A_1B_1')'C_1$ and transistor 75 forming the "and" signal $(A_1'B_1+A_1B_1')C_1'$. Each transistor has a high potential output on the collector thereof when it conducts, in a manner similar to the circuit 39. Thus circuits 39 and 40 effectively mechanize the sum equation $S_0$ to generate the waveforms representing the sum digits.

In order to generate a carry signal $C_0$ as a result of the addition, carry circuit 41 is arranged to be mechanized in accordance with the logical equation for the carry signal $C_0$. The inputs to this circuit are the signal $(A_1'B_1+A_1B_1')$ generated on the output line 59 of circuit 39, which is connected by way of line 91 to the base 93 of transistor 90 and the emitter 92 of transistor 89. The input signal $B_1$ is further connected to the emitter 95 of transistor 90, and the signal $C_1'$ derived from the false output of carry flip-flop C1 is connected to the base 94 of transistor 89. Thus each of these transistors forms one of the "and" signals $(A_1'B_1+A_1B_1')C_1$ or $(A_1'B_1+A_1B_1')'B_1$ on output line 97 by conducting through the load resistor 109.

For a further explanation of the operation of the adder circuit, reference will be made to FIG. 3 which shows the waveform explaining the serial addition of the digits represented by signals $A_1$ and $B_1$. During each of the periods $P_1$, $P_2$, etc., the digits represented by signals $A_1$ and $B_1$ are added with the carry-in digit represented by the signal $C_1$, from the previous period, to give the sum digit represented by signal $S_0$, and to give a carry-out digit represented by signal $C_0$. As previously noted, signal $C_0$ is effectively delayed by use of flip-flop C1 so as to be added as signal $C_1$ along with the other input digits during the following period. Thus, as illustrated, during period $P_1$, the digits represented by waveforms $A_1$ and $B_1$ are "one," and by $C_1$ is "zero." Thus the signal $$(A'B_1+A_1B_1')$$

oin the output line 59 of circuit 39 is "zero." Under these conditions, neither transistor 74 nor 75 of circuit 40 conducts and hence $(A_1'B_2+A_1B_1')C_1'$ and $$(A_1'B_1+A_1B_1')'C_1$$

are both at the low potential, resulting in the sum $S_0$ being "zero." As for the carry circuit 41, the transistor 89 is not conducting and hence $(A_1'B_1+A_1B_1')C_1$ is at the low potential but $(A_1'B_1+A_1B_1')'B_1$ is at the high potential, resulting in the carry-out signal $C_0$ being equal to "one." Consequently, at the end of period $P_1$, the $C_0$ signal opens the gate at flip-flop C1 to allow the clock pulse to trigger flip-flop C1 into the "one" state.

During period $P_2$, the digits represented by $A_1$ is "zero," by $B_1$ is "zero," and by $C_1$ is "one," inasmuch as the carry $C_0$ generated by the addition during period $P_1$ was a "one." Accordingly, the signal $(A_1'B_1+A_1B_1')$ is at the low potential and hence $(A_1'B_1+A_1B_1')C_1'$ is at the low potential. But for these conditions, the transistor 74 conducts and hence the "and" signal $(A_1'B_1+A_1B_1')'C_1$ is at the high potential, thus the sum $S_0$ is "one." Furthermore, the signal $(A_1'B_1+A_1B_1')'B_1$ is at the low potential and $(A_1'B_1+A_1B_1')C_1$ is at the low potential, resulting in the carry $C_0$ being "zero." The carry $C_0$ is stored in flip-flop C1 by the gated clock pulse at the end of period $P_2$ triggering the flip-flop C1 into the "zero" state.

During period $P_3$ the digit represented by $A_1$ is "one," by $B_1$ is "zero," and by $C_1$ is "zero." Thus, the sum $S_0$ Finally, during period $P_4$, the digits represented by $A_1$, $B_1$, and $C_1$ are all "zero," resulting in the sum digit $S_0$ being "zero" and the carry-out digit $C_0$ being "zero."

From the foregoing description, it is apparent that the present invention provides a novel, highly simplified serial adder capable of operating on digits represented by signals having a high repetition rate. The means and construction herein disclosed comprise a preferred embodiment for mechanizing a particular form of the Boolean algebraic functions defining the process of binary addition, but it should be obvious that the form of these functions can be altered and therefore the circuits are susceptible of modification in form and arrangement of parts without departing from the principle involved or sacrificing any of its advantages. The invention is therefore claimed in any of its forms or modifications within the legitimate and valid scope of the appended claims.

1. An electronic computer circuit for serially adding binary digits comprising: sum and carry output terminals and first, second, and third input terminals, said input terminals adapted to receive, respectively, first input signals representative of an addend, second input signals representative of an augend, and third input signals representative of a carry-in digit; a first logical gating means responsive to said first and second input signals for producing an intermediate signal representing that said first and second input signals are different; a second logical gating means responsive to said third input signal and said intermediate signal for producing at said sum output terminal signals representative of the sum digits; means for providing an inverted form of said third input signal; a third logical gating means responsive to either one of said first or second input signals, said intermediate signal and the inverted form of said third input signal for producing at said carry output terminal signals representative of the carry-out digits; and delay means for connecting said carry output terminal to said third input terminal.

2. An electronic circuit as described in claim 1, wherein each said gating means comprises: a pair of transistors each having a base, an emitter, and a collector, and a common collector load resistor, and wherein the input signals to the gating means are applied on the emitter and base of said transistors to cause one of said transistors to conduct through said load resistor for producing a signal.

3. A logical gating circuit comprising: a first and second transistor, each having a base electrode, an emitter electrode, and a collector electrode; a common resistor connecting the collectors of both said transistors to a potential source; an output lead connected to said collectors; and sources of binary signals representing terms to be logically combined connected to the emitters and bases of said transistors, said binary signals having such potential values that one or the other transistor, but not both, can conduct through said resistor, to thereby generate a signal having substantially said same potential values on said output lead representing a logical "and" combination of the term represented by the signal on the emitter and the inverse of the term represented by the signal on the base of the conducting transistor.

4. A gating circuit comprising: a first and second transistor, each having a base electrode, an emitter electrode, and a collector electrode; a first source of binary signals connected to the base of said first transistor and the emitter of said second transistor; a second source of binary signals connected to the emitter of the first transistor and the base of the second transistor; a common resistor connecting the collectors of both said transistors to a potential source; and an output lead connected to said collectors.

5. A circuit for generating an exclusive "or" function comprising: a first and second p-n-p transistor, each having a base electrode, an emitter electrode, and a collector electrode; a first source of binary signals connected to the base of said first transistor and the emitter of said second transistor; a second source of binary signals connected to the emitter of the first transistor and the base of the second transistor; a common resistor connecting the collectors of both said transistors to a low potential; and an output lead connected to said collectors having signals thereon representative of an exclusive "or" function.

6. A circuit for generating an exclusive "or" logical function, comprising: a first and a second transistor each having a base, an emitter, and a collector; a first input terminal connected to the emitter of said first and the base of said second transistor; a second input terminal connected to the base of said first and the emitter of said second transistor; a resistor connecting both the collectors of said first and second transistors to a potential source; an output terminal connected to the junction of said resistor and the collectors of said first and second transistors; and a source of input signals having either a high or low potential connected to each of said first and second input terminals; whereby the potentials simultaneously applied to said first and second input terminals cause either one of said transistors to conduct current through said resistor or neither transistor to conduct, thus resulting in either a high or a low potential being supplied on said output terminal.

7. An adder circuit comprising: a first exclusive "or" function circuit comprising a first and second transistor, each having a base, an emitter, and a collector, a first input connected to the base of said first and the emitter of said second transistor, a second input connected to the base of the second and the emitter of the first transistor, and an output connected to a common collector load resistor provided for said first and second transistors; a second exclusive "or" function circuit comprising a third and fourth transistor, each having a base, an emitter, and a collector, a third input connected to the base of said third and the emitter of said fourth transistor, said output of said first exclusive "or" function circuit connected as the input to the base of said fourth and the emitter of said third transistor, and an output connected to a common collector load resistor provided for said third and fourth transistor; and a third exclusive "or" function circuit comprised of a fifth and sixth transistor, each having a base, an emitter, and a collector, said output of said first exclusive "or" function circuit connected as the input to the base of said fifth and the emitter of said sixth transistor, said first input connected as the input to the emitter of said fifth transistor and an inverted form of the signal on said third input connected as the input to the base of said sixth transistor, and an output connected to a common collector load resistor provided for said fifth and sixth transistors.

8. A gating circuit comprising: a first and a second transistor, each having a base electrode, an emitter electrode, and a collector electrode; a first source of binary signals connected to the base of said first transistor and the emitter of said second transistor; a second source of binary signals connected to the emitter of the first transistor and the base of the second transistor; a common resistor connecting the collectors of both said transistors to a potential source; and an output lead for binary signals connected to said collectors, said gating circuit arranged such that the binary signals on said output lead are capable of sustaining a load while maintaining a voltage swing between upper and lower potential levels, said levels being substantially equivalent to the levels of the voltage swings of said first and second sources of binary signals.

9. A circuit for generating an exclusive "or" function comprising: a first and a second p-n-p transistor, each having a base electrode, an emitter electrode, and a collector electrode; a first source of binary signals connected by way of a limiting resistance to the base of said first transistor and directly to the emitter of said second transistor; a second source of binary signals connected directly to the emitter of the first transistor and by way of a limiting resistance to the base of the second transistor; a common resistor connecting the collectors of both said transistors to a low potential; and an output lead connected to said collectors having signals thereon representative of an exclusive "or" function.

10. An electronic serial binary adder circuit for adding pairs of binary numbers whose binary "one" and binary "zero" digits are represented by relatively high and low potential signals, respectively, said adder circuit comprising: a sum output terminal and a carry output terminal; a first input terminal adapted to receive a first input signal representative of a digit of an addend; a second input terminal adapted to receive a second input signal representative of a digit of an augend; a first feedback input lead adapted to receive a first feedback signal representative of a carry-in digit; a second feedback input lead adapted to receive a second feedback signal which is the inverse of the first feedback signal; a first gating means responsive to said first and second input signals and adapted to produce an intermediate signal which has a value of "one" when said first and second input signals are different in value from each other and which has a value of "zero" when said signals are not different in value from each other; a second gating means responsive to said first feedback signal and said intermediate signal and adapted to produce at said sum output terminal an output signal representative of the sum digits, said output signal having a value of "one" when said first feedback signal and said intermediate signal are different in value from each other, and a value of "zero" when said signals are not different in value from each other; a third gating means responsive to one of said input signals, said intermediate signal, and said second feedback signal, and adapted to produce at said carry output terminal output signals which represent the carry-out digits, said output signals having a value of "one" when said intermediate signal has a relatively high value and said second feedback signal has a relatively low value or when said intermediate signal has a relatively low value and said second input signal has a relatively high value, and said output signals having a value of "zero" when said intermediate signal and said second feedback signal have a relatively high value or when said intermediate signal and said one of said input signals have a relatively low value; and delay means including means for providing said first and second feedback signals for connecting said carry output terminal to said first and second feedback input leads.

11. A serial binary adder circuit comprising: a first exclusive "or" gating means adapted to be simultaneously supplied with separate input binary digit signals indicative of corresponding orders of binary numbers to be summed; a digit delay means including a flipflop circuit provided with a pair of output circuits designated true and false, respectively, and capable of being triggered, at the termination of the input binary digit signals to the first exclusive "or" gating means, from a false to a true state, or vice-versa, by carry-out signals indicative of a binary one or a binary zero, respectively; a further gating means responsive to an output signal from said first exclusive "or" gating means, to either one of the input binary digit signals, and to a binary signal derived from the false output of said flipflop circuit so as to generate binary carry-out digit signals, said flipflop circuit being adapted to receive said carry-out signals and being responsive thereto to produce carry-in binary signals on the output circuits thereof in synchronism with the input binary digit signals currently supplied to said first exclusive "or" gating means; and second exclusive "or" gating means responsive to output signals from the first exclusive "or" gating means and to the carry-in binary signals derived from the true output of said flipflop circuit so as, sequentially, to generate binary output digit signals representing successive orders of the sum of the input binary digits.

12. A serial binary adder circuit according to claim 11 wherein said first exclusive "or" gating means, said further gating means, and said second exclusive "or" gating means, each comprises: a pair of transistors each having a base, an emitter and a collector; a common load resistor connected between the collectors and a potential source; and an output circuit connected to said collectors; and wherein said transistors for each said gating means are arranged such that, in response to signals supplied on the emitters and bases thereof one or the other but not both of the transistors conduct, the signal appearing on the output circuit from the collectors representing the logical "and" combination of the signal on the emitter and the inverse of the signal on the base of the conducting transistor.

References Cited in the file of this patent

UNITED STATES PATENTS

| | | |
|---|---|---|
| 2,628,310 | Wood | Feb. 10, 1953 |
| 2,629,834 | Trent | Feb. 24, 1953 |
| 2,734,134 | Beard | Feb. 7, 1956 |
| 2,761,965 | Dickinson | Sept. 4, 1956 |
| 2,765,115 | Beloungie | Oct. 2, 1956 |
| 2,772,370 | Bruce et al. | Nov. 27, 1956 |
| 2,806,153 | Walker | Sept. 10, 1957 |
| 2,852,699 | Ruhman | Sept. 16, 1958 |

OTHER REFERENCES

Williams et al.: Univ. High-Speed Digital Computers: Serial Computing Circuits, Proc. Inst. of Elec. Engrs., Part II, April 1952, pages 108 to 112.

Chaplin: The Transistor Regenerative Amplifier As a Computer Element, Proceedings of the Institution of E. E. (Part III), September 1954, pp. 306, 307.

Beter et al.: Directly Coupled Transistor Circuits, Electronics, June 1955, pages 132 to 136.

Hunter: Handbook of Semiconductor Electronics; McGraw-Hill Book Co., Inc., New York (Oct. 15, 1956), pp. 15–47 relied on.

UNITED STATES PATENT OFFICE
CERTIFICATE OF CORRECTION

Patent No. 3,001,711 September 26, 1961

Robert Frohman

It is hereby certified that error appears in the above numbered patent requiring correction and that the said Letters Patent should read as corrected below.

Column 3, lines 61 and 62, for "circuits" read -- circuit --; column 5, line 7, for "conducted" read -- conducting --; line 42, for "waveform" read -- waveforms --; line 56, for "oin" read -- on --; same column 5, line 58, for "$(A_1'B_2+A_1B_1')C_1'$" read -- $(A_1'B_1+A_1B_1')C_1'$ --.

Signed and sealed this 13th day of February 1962.

(SEAL)

Attest:

ERNEST W. SWIDER
Attesting Officer

DAVID L. LADD
Commissioner of Patents

Disclaimer 3,001,711.—*Robert Frohman*, Gardena, Calif. TRANSISTOR ADDER CIRCUITRY. Patent dated Sept. 26, 1961. Disclaimer filed July 31, 1964, by the assignee, *The National Cash Register Company*.

Hereby enters this disclaimer to claims 4, 5 and 6 of said patent.

[*Official Gazette November 3, 1964.*]

Notice of Adverse Decision in Interference

In Interference No. 93,163 involving Patent No. 3,001,711, R. Frohman, Transistor adder circuitry, final judgment adverse to the patentee was rendered Apr. 30, 1964, as to claims 4, 5 and 6.

[*Official Gazette December 22, 1964.*]